United States Patent
Polkovnikov et al.

(10) Patent No.: US 10,146,469 B2
(45) Date of Patent: Dec. 4, 2018

(54) DYNAMIC STORAGE TIERING BASED ON PREDICTED WORKLOADS

(71) Applicant: EMC IP Holding Company LLC, Hopkinton, MA (US)

(72) Inventors: Aleksei Alexandrovich Polkovnikov, Oberhausen (DE); Sergey Alexandrovich Alexeev, St. Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 99 days.

(21) Appl. No.: 15/129,522

(22) PCT Filed: Sep. 29, 2015

(86) PCT No.: PCT/RU2015/000625
§ 371 (c)(1),
(2) Date: Sep. 27, 2016

(87) PCT Pub. No.: WO2017/058045
PCT Pub. Date: Apr. 6, 2017

(65) Prior Publication Data
US 2017/0262216 A1   Sep. 14, 2017

(51) Int. Cl.
*G06F 3/06* (2006.01)

(52) U.S. Cl.
CPC .......... *G06F 3/0647* (2013.01); *G06F 3/067* (2013.01); *G06F 3/0611* (2013.01); *G06F 3/0649* (2013.01); *G06F 3/0685* (2013.01)

(58) Field of Classification Search
CPC .......................... G06F 3/0647; G06F 3/0649
See application file for complete search history.

(56) References Cited

U.S. PATENT DOCUMENTS

| | | | |
|---|---|---|---|
| 6,948,042 B2 * | 9/2005 | Nagase | G06F 3/061 711/117 |
| 6,978,259 B1 * | 12/2005 | Anderson | G06F 3/0605 706/19 |
| 7,020,758 B2 * | 3/2006 | Fisk | H04L 41/147 711/114 |
| 7,539,709 B1 | 5/2009 | Vengerov et al. | |
| 7,769,021 B1 | 8/2010 | Chen et al. | |
| 8,112,586 B1 | 2/2012 | Reiner et al. | |

(Continued)

OTHER PUBLICATIONS

Hyndman, Rob J. "Cyclic and seasonal time series". Published Dec. 14, 2012. <https://robjhyndman.com/hyndsight/cyclicts/>. (Year: 2012).*

(Continued)

*Primary Examiner* — Charles Rones
*Assistant Examiner* — Hewy H Li
(74) *Attorney, Agent, or Firm* — BainwoodHuang

(57) ABSTRACT

A technique for performing storage tiering in a data storage system includes monitoring storage demands over time to generate a time-based record of storage demands. Based on the time-based record, the data storage system makes predictions of future demand and proactively performs storage tiering based on the predictions. The technique therefore readies the data storage system for predictable changes in demand, such that, should those changes occur, the data storage system is already configured to manage them efficiently.

20 Claims, 5 Drawing Sheets

(56) References Cited

U.S. PATENT DOCUMENTS

| | | | | |
|---|---|---|---|---|
| 8,688,878 B1* | 4/2014 | Dolan | | G06F 3/061 |
| | | | | 710/33 |
| 8,949,483 B1* | 2/2015 | Martin | | G06F 3/0653 |
| | | | | 710/15 |
| 9,021,200 B1* | 4/2015 | Kushmerick | | G06F 12/02 |
| | | | | 711/114 |
| 9,069,682 B1 | 6/2015 | Veeraswamy | | |
| 9,356,846 B2* | 5/2016 | Cremonesi | | G06Q 10/06 |
| 9,378,460 B2 | 6/2016 | Polkovnikov et al. | | |
| 9,400,792 B1 | 7/2016 | Bono et al. | | |
| 9,934,069 B2 | 4/2018 | Polkovnikov et al. | | |
| 2005/0015547 A1* | 1/2005 | Yokohata | | G06F 3/0605 |
| | | | | 711/114 |
| 2005/0071596 A1* | 3/2005 | Aschoff | | G06F 9/5016 |
| | | | | 711/170 |
| 2006/0129771 A1* | 6/2006 | Dasgupta | | G06F 3/0605 |
| | | | | 711/162 |
| 2008/0222644 A1* | 9/2008 | Richards | | G06F 3/0605 |
| | | | | 718/104 |
| 2011/0202732 A1* | 8/2011 | Montgomery | | G06F 3/061 |
| | | | | 711/154 |
| 2012/0216008 A1 | 8/2012 | Jennas et al. | | |
| 2013/0151804 A1* | 6/2013 | Alatorre | | G06F 17/30165 |
| | | | | 711/170 |
| 2013/0290598 A1* | 10/2013 | Fiske | | G06F 3/0625 |
| | | | | 711/103 |
| 2014/0130055 A1* | 5/2014 | Guha | | G06F 3/0604 |
| | | | | 718/104 |
| 2015/0088790 A1* | 3/2015 | Chidlovskii | | G06Q 30/0202 |
| | | | | 706/12 |

OTHER PUBLICATIONS

International Search Report and the Written Opinion of the International Searching Authority for International Application No. PCT/RU2015/000625; mailed from the International Searching Authority dated Jul. 14, 2016; 9 pages.

U.S. Appl. No. 10/037,369, filed Jul. 31, 2018, Bono, Jean-Pierre.

* cited by examiner

DYNAMIC STORAGE TIERING BASED ON PREDICTED WORKLOADS

BACKGROUND

Data storage systems are arrangements of hardware and software that include one or more storage processors coupled to arrays of non-volatile storage devices. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Some data storage systems employ storage tiering. Such systems include multiple tiers of non-volatile storage with each tier providing a different quality of service. For example, a system may include a first tier (Tier 1) for SSDs (solid state drives), a second tier (Tier 2) for SAS (Serial-Attached SCSI) drives, and a third tier (Tier 3) for SATA (Serial Advanced Technology Attachment) drives, for example. The system manages placement of data on the different storage tiers to make the best use of disk drives overall. For example, frequently accessed data may be placed on Tier 1 storage, less frequently accessed data may be placed on Tier 2 storage, and seldom accessed data may be placed on Tier 3 storage.

Some data storage systems perform storage tiering automatically. These systems monitor the activity of storage elements and move data between storage tiers to best utilize available resources and promote efficiency. For example, a set of data stored on SATA drives may be moved to SSDs in response to the system detecting that the set of data is frequently accessed. Likewise, a set of data stored on SSDs or SAS drives may be moved to SATA drives if the system detects that the data is rarely accessed. Automatic storage tiering (also called AST or auto-tiering) thus helps to ensure that disk drives of different types are put to their most effective use.

SUMMARY

Prior auto-tiering solutions operate by detecting changes in IO traffic and moving data between storage tiers in response to detected changes. For example, an auto-tiering process might detect that data stored on a lower tier, which data was previously accessed only rarely, has recently been accessed much more frequently. In response to detecting this change, the auto-tiering process may move the data to a higher storage tier (e.g., to SSDs), which is better able to handle the increased demand.

Unfortunately, data movement induced by conventional auto-tiering is necessarily reactive and therefore lags behind demand. As a result, clients of such data storage systems may temporarily see reductions in their quality of service as they wait for the systems to recognize changes and to reconfigure.

In contrast with the prior approach, which is reactive and necessarily lags behind changes in demand, an improved technique for performing storage tiering in a data storage system includes monitoring storage demands over time to generate a time-based record of storage demands. Based on the time-based record, the improved technique makes predictions of future demand and proactively performs storage tiering based on the predictions. The improved technique therefore readies the data storage system for predictable changes in demand, such that, should those changes occur, the data storage system is already configured to manage them efficiently. Delays in responding to changes in demand and consequent reductions in quality of service are therefore reduced or eliminated.

Certain embodiments are directed to a method of performing storage tiering in a data storage system having multiple storage tiers. Each storage tier provides a respective quality of service. The method includes processing IO (Input/Output) requests, the IO requests specifying reads and writes of data in the data storage system, and monitoring IO characteristics of the IO requests as they are being processed to generate a time-based record of IO characteristics. The method further includes generating predictions of future IO characteristics based on the time-based record. The predictions include a predicted level of IO characteristics at a predicted time in the future. Prior to the predicted time and when the IO characteristics are different from the predicted level, the method further includes proactively migrating portions of data between the storage tiers, based on the predictions of future IO characteristics, to prepare the data storage system efficiently to manage the predicted level of IO characteristics at the predicted time.

Other embodiments are directed to a data storage system constructed and arranged to perform a method of performing storage tiering, such as the method described above. Still other embodiments are directed to a computer program product. The computer program product stores instructions which, when executed on control circuitry of a data storage system, cause the data storage system to perform a method of performing storage tiering, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for performing storage tiering in a data storage system includes monitoring storage demands over time to generate a time-based record of storage demands. Based on the time-based record, the improved technique makes predictions of future demand and proactively performs storage tiering based on the predictions.

Figure 1:
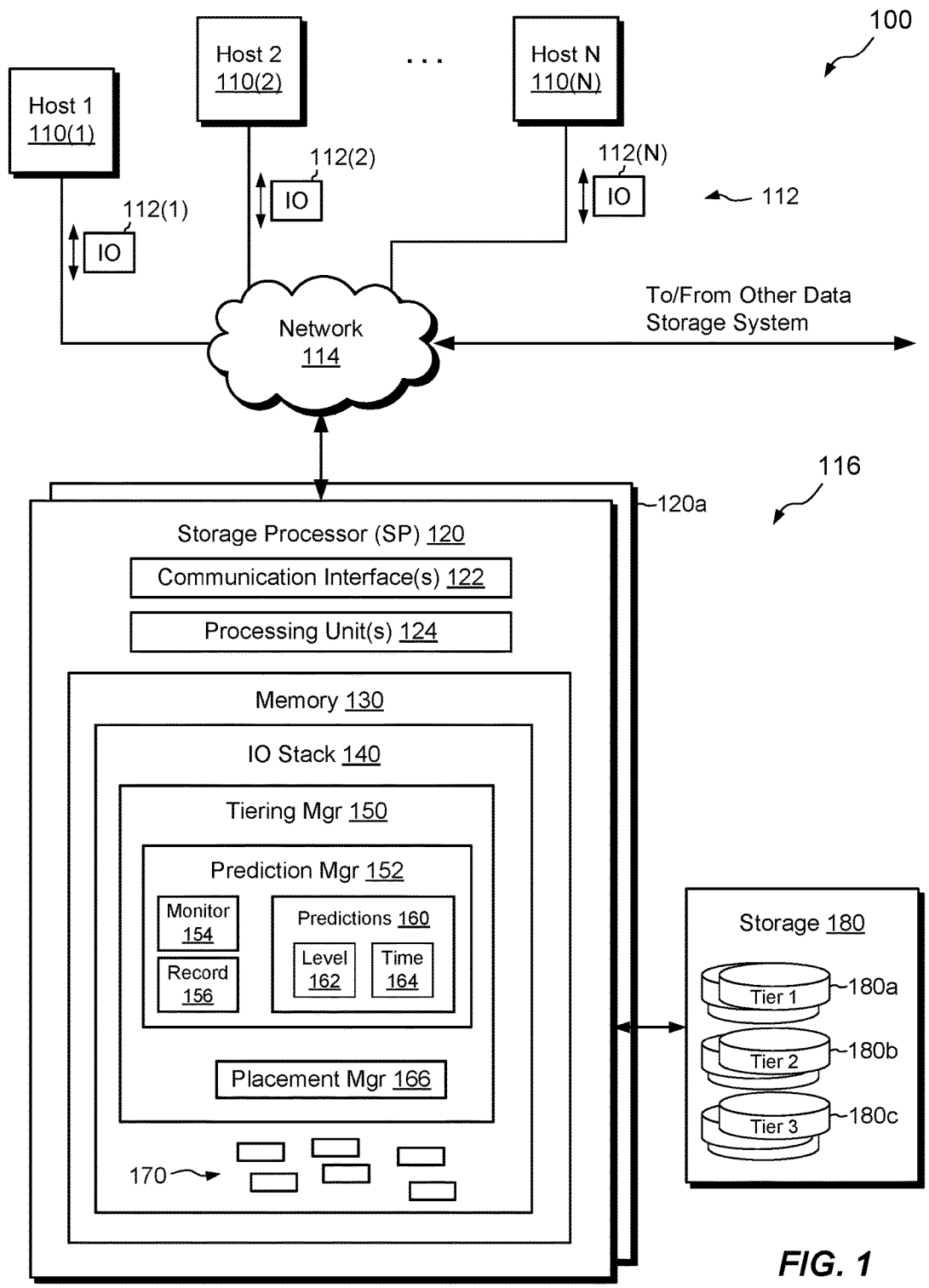
FIG. 1 is block diagram showing an example environment in which embodiments of the improved technique hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 includes, for example, multiple tiers of storage, such as Tier 1 storage 180a, Tier 2 storage 180b, and Tier 3 storage 180c. In an example, Tier 1 storage 180a includes SSDs, Tier 2 storage 180b includes SAS drives, and Tier 3 storage 180c includes SATA drives. Any number of storage tiers of any type may be provided; the particular storage tiers shown are intended merely to be illustrative. The data storage system 116 may include multiple SPs like the SP 120 (e.g., a second SP, 120a). For example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. The hosts 110(1-N) may use any of the above protocols, some subset thereof, or other protocols besides those shown. As is known, Fibre Channel and iSCSI are block-based protocols, whereas NFS, SMB 3.0, and CIFS are file-based protocols. In an example, the SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs and associated co-processors and chipsets. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations defined by the software constructs. Although certain software constructs are specifically shown and described, it is understood that the memory 130 typically includes many other software constructs, which are not shown, such as an operating system, various applications, processes, and daemons.

The memory 130 is seen to include an IO stack 140. The IO stack 140 provides an execution path for host IOs (e.g., IO requests 112(1-N)). The IO stack 140 is seen to include a tiering manager 150 and portions of data 170. Although the portions of data 170 are shown within the IO stack 140, it is understood that the portions of data 170 are logical representations of data persistently stored in the storage 180.

The tiering manager 150 includes a prediction manager 152 and a placement manager 166. The prediction manager 152 generates predictions of future IO characteristics, based on past IO characteristics, and the placement manager 166 moves data between storage tiers 180a-180c and/or places data on storage tiers based on the generated predictions.

The prediction manager 152 includes a monitor 154 for monitoring characteristics of IO requests 112 processed by the data storage system 116 and a time-based record 156 of IO characteristics obtained by the monitor 154. The prediction manager 152 also generates predictions 160 of future IO characteristics. The predictions 160 include a predicted level 162 of IO characteristics at a predicted time 164 in the future. Typically, the predictions 160 include many predicted levels at many future times.

In example operation, the hosts 110(1-N) issue IO requests 112 (e.g., 112(1-N), or any number or combination thereof) to the data storage system 116. The IO requests 112 are directed to data objects served by the data storage system 116, such as LUNs (logical units), file systems, or VVols (Virtual Volumes, available from VMware, Inc. of Palo Alto, Calif.), for example. The SP 120 receives the IO requests 112 at the communication interfaces 122 and passes the IO requests 112 to the IO stack 140 for further processing. The IO stack 140 performs mapping and other data services to effect reads and writes of the storage 180. For example, for IO requests 112 designating reads, the IO stack 140 maps addressed locations specified in the IO requests (e.g., a block offset ranges, file names, etc.) to mapped locations in storage 180, reads the corresponding disk drives, and returns the requested data to the requesting hosts. For IO requests 112 designating writes, the IO stack 140 maps addressed locations specified in the requests to one or more locations in storage 180 and writes the disk drives at the mapped locations.

As the IO stack 140 processes IO requests 112 over time, the monitor 154 obtains characteristics of the IO requests 112, such as their rate of arrival (e.g., measured in IOs per second, or "IOPs"), whether each IO request specifies a read or a write, the amount of data to be written or read (IO size), and whether the IO request is a random access (read or write) or part of a sequential access (read or write) of storage 180. The monitor 154 may obtain additional characteristics, fewer characteristics, or different characteristics from those described. The monitor 154 stores the characteristics of the IO requests 112 in the time-based record 156, along with associated timing information (e.g., timestamps). Over time, the time-based record 156 grows to provide a historical record of IO workload demands on the data storage system 116. In some examples, the prediction manager 152 stores data for each monitored IO characteristic separately in the time-based record 156. For instance, IO characteristics for IOPs, IO size, and so forth, may be separately maintained. In other examples, the prediction manager 152 computes, based on the separate IO characteristics, an overall measure of IO activity at different points in time (e.g., for each second, each minute, etc.). The prediction manager 152 then stores the overall measures of IO activity with respective timestamps in the time-based record 156. Each overall measure may be expressed as a single number, or as an ordered set of numbers.

As the time-based record 156 continues to accumulate IO characteristics of IO requests 112 actually received, the prediction manager 152 performs processing activities to generate predictions 160 of IO performance looking forward in time. Where the time-based record 156 stores IO characteristics separately, the prediction manager 152 may make a different prediction for each IO characteristic (e.g., one prediction for IOPs, one prediction for IO size, etc.). Where the time-based record 156 stores only overall measures of IO activity, the prediction manager 152 may instead generate predictions of overall IO activity. Indeed, even if the time-based record 156 stores values of IO characteristics separately, the prediction manager 152 may nevertheless generate predictions as overall indicators of IO activity. Such predictions 160 may be generated using any suitable prediction technique, such as time-series analysis, curve fitting extrapolation, neural nets, fuzzy logic, or reinforcement learning, for example.

The tiering manager 150 analyzes predictions 160, working to identify opportunities proactively to migrate portions of data between storage tiers 180a, 180b, and 180c, to prepare the data storage system 116 efficiently to handle predicted changes in workload. For example, the prediction manager 152 may predict the level 162 of IO characteristics at the time 164. Sometime prior to the time 164, and when the actual level of IO characteristics is different from the predicted level 162 (e.g., before the level 162 is reached), the tiering manager 150 may invoke the placement manager 166 to perform revised storage tiering. For example, the prediction manager 152 may predict that particular portions of data 170, which are currently served from one or more storage tiers 180a, 180b, and/or 180c, would be more effectively placed at the time 164 on different storage tiers from the ones on which they are currently located. In an example, the prediction manager 152 identifies a time, prior to the time 164, that the predictions 160 indicate will be relatively inactive in terms of IO activity, and directs the placement manager 166 to perform revised storage tiering at the identified, inactive time. Revised storage tiering such as this may be performed repeatedly, based on newly generated predictions 160, and adapting as circumstances change.

In an example, the placement manager 166 places data on storage tiers 180a, 180b, and 180c based on predictions 160, by applying a model that takes into account predicted IO characteristics as well as available storage space on each storage tier. Although the placement manager 166 may be configured in various ways, in general it operates to place data predicted to be most frequently accessed on the highest storage tier 180a, data predicted to be accessed less frequently on the middle storage tier 180b, and data predicted to be accessed relatively infrequently on the lowest storage tier 180c.

In some examples, the tiering manager 150 acts not only to revise storage tiering for data already written to the data storage system 116, but also to right-source data as it is being newly written. For example, when receiving an IO request 112 specifying new data to be written, the tiering manager 150 checks predictions 160 for IO characteristics of data related to the new data to be written, e.g., other data in the same data object for which predictions have already been made, and applies those predictions in placing the new data. For example, if the tiering manager 150 has already placed data related to the new data on the first storage tier 180a, the tiering manager 150 may act also to place the new data on the first storage tier 180a (i.e., on the same storage tier).

In an example, the tiering manager 150 maintains the time-based record 156 of IO characteristics on a per-storage-extent basis, i.e., at the granularity of an individual storage extent. As is known, a "storage extent" is an increment of contiguous storage, such as a block or a slice. A "block" is the smallest unit of storage that may be allocated to a data object and may be, for example, 8 KB in size, although blocks sizes may vary considerably. A "slice" is the smallest unit of storage that may be provisioned to a data object. Typical slice sizes are 256 MB or 1 GB, for example, although slice sizes may also vary. As used herein, the term storage extent is intended to cover not only units, like blocks or slices, but also larger structures built from such units, such as LUNs, storage pools, and even entire arrays. As the IO stack 140 processes IO requests 112, the tiering manager 152 may maintain a separate time-based sub-record for each storage extent. It should be understood that the definition of a storage extent is intended to be flexible. For example, a storage extent may be a physical extent or a logical extent. Also, the particular examples of storage extents provided herein are intended to be merely illustrative.

In a particular example, the tiering manager 150 is configured to monitor and store characteristics of IO requests 112 in the time-based record 156 at the granularity of a particular type of storage extent, to the exclusion of other types of storage extents. For example, the data storage system may monitor and store IO characteristics on a per-slice basis, but not on a per-block basis, per LUN basis, per-pool basis, and so forth.

Likewise, predictions 160 may also be generated on a per-storage-extent basis, i.e., with per-storage-extent granularity. The type of storage extent used may be the same as the type used for generating sub-records. For example, if the prediction manager 152 generates sub-records of IO characteristics at per-slice granularity, the prediction manager 154 may also generate predictions 160 (i.e., "sub-predictions") at per-slice granularity.

Further, in an example, migration of data among storage tiers may be performed on a per-storage-extent basis, i.e., with per-storage-extent granularity. The type of storage extent used may be the same as the type used for generating sub-records and for generating sub-predictions. For example, if the prediction manager 152 generates sub-records and sub-predictions at slice-level granularity, the placement manager 166 may also perform data migration at slice-level granularity. In an example, to migrate data between two storage tiers, the placement manager 166 reads data from a storage extent on a first storage tier and copies the data to a free storage extent of the same size on a second storage tier. The storage extent on the first storage tier may then be returned to circulation, where it may be reused for a new purpose.

Figure 2A:
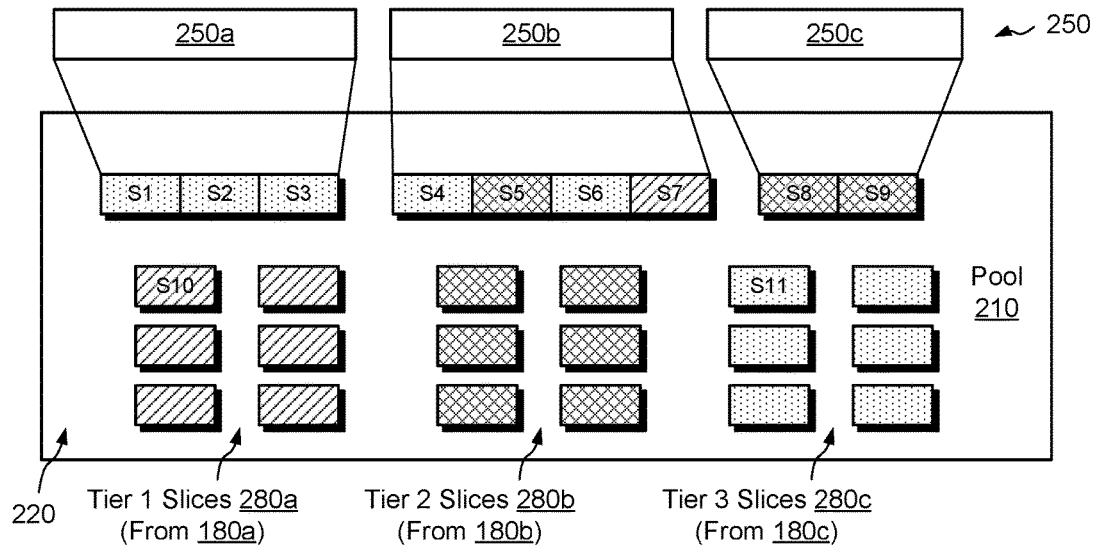
FIGS. 2A and 2B are block diagrams showing an example storage pool supporting multiple storage tiers.
Figure 2B:
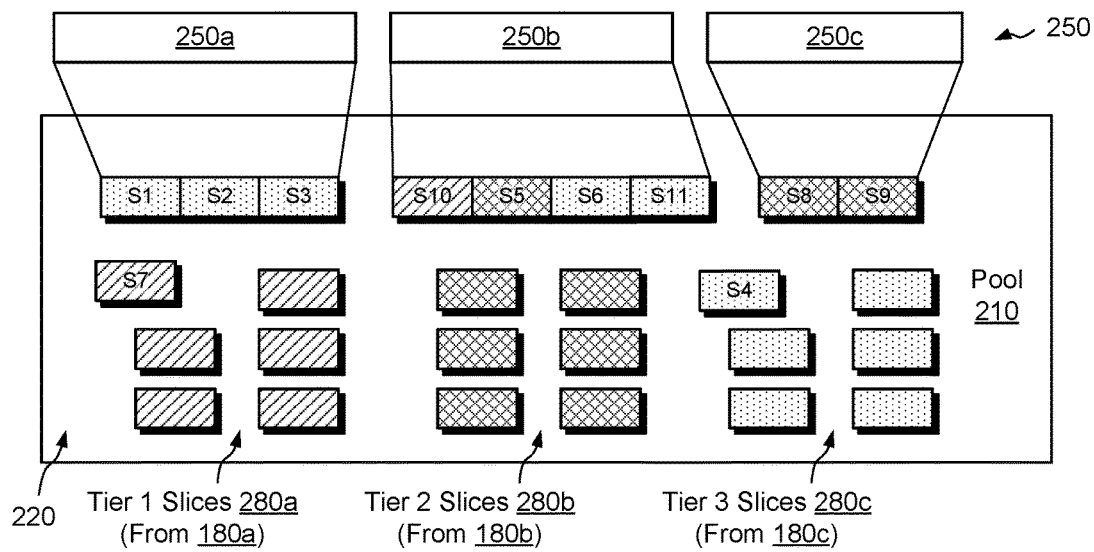

FIGS. 2A and 2B show an example storage pool 210, which may be operated within the IO stack 140 of FIG. 1. As shown in FIG. 2A, the storage pool 210 includes multiple slices 220. In an example, slices 220 are generated as uniformly-sized portions of RAID (Redundant Array of Independent Disks) groups arranged from the storage 180. Three different types of slices 220 are shown. For example, Tier 1 slices 280a are generated from RAID groups of disk drives providing Tier 1 storage 180*a* (e.g., SSDs), Tier 2 slices 280*b* are generated from RAID groups of disk drives providing Tier 2 storage 180*b* (e.g., SAS drives), and Tier 3 slices 280*c* are generated from RAID groups of disk drives providing Tier 3 storage 180*c* (e.g., SATA drives). In the example shown, the IO stack 140 has provisioned slices S1-S3 to data object 250*a*, slices S4-S7 to data object 250*b* and slices S8 and S9 to data object 250*c*. As indicated by shading, S1-S4 are Tier 3 slices, S5, S8, and S9 are Tier 2 slices, and S7 is a Tier 1 slice. Thus, data object 250*a* is built entirely from Tier 3 slices, data object 250*c* is built entirely from Tier 2 slices, and data object 250*b* is built from a combination of Tier 1, Tier 2, and Tier 3 slices. Slices that are not provisioned to a data object are free. In an example, the data objects 250 are host-accessible data objects, such as LUNs, file systems, and/or VVols. The data storage system 116 may include any number of storage pools, like the pool 210, with each storage pool including its own slices. Some storage pools may include slices of multiple types, as shown here, while others may include slices of a single type. For purposes of this example, it is assumed that the tiering manager 150 operates at the granularity of slices 220.

During operation, the tiering manager 150 (FIG. 1) performs data migration to move contents of data between storage tiers to better meet demands indicated in the predictions 160. For instance, we suppose that the predictions 160 indicate that slice S4 will become very active at time 164 and that the slice S7 will become inactive. To prepare for the data storage system 116 to meet the predicted change in demand, the tiering manager 150 directs the placement manager 166 to copy the contents of slice S4 to a free slice of a higher tier, such as to slice S10 in Tier 1. The tiering manager 150 also directs the placement manager 166 to copy the contents of slice S7 to a free slice of a lower tier, such as to slice S11 in Tier 3. The placement manager 166 then operates in coordination with the storage pool 210 to replace slices S4 and S7 with slices S10 and S11, respectively.

The resulting arrangement is shown in FIG. 2B. Here, slices S4 and S7 have been replaced with S10 and S11. Slices S4 and S7 have been freed and returned to the pool 210, where they may be reused elsewhere.

Figure 3:
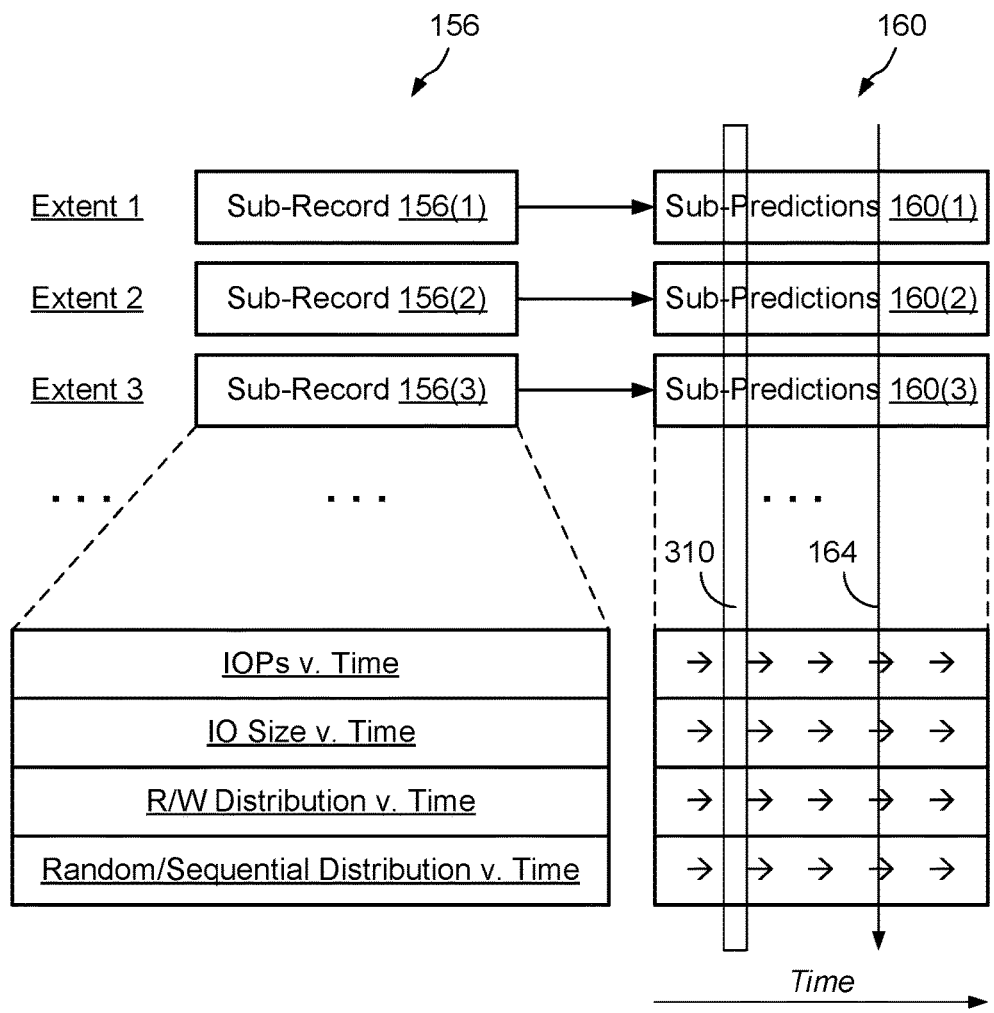
FIG. 3 is a block diagram showing an example time-based record of IO characteristics processed by the data storage system of FIG. 1 and of example predictions.

FIG. 3 shows an example arrangement of the time-based record 156 and the predictions 160 in greater detail. Here, it is seen that the time-based record 156 includes multiple time-based sub-records 156(1), 156(2), 156(3), and so on, and that the predictions 160 include multiple sub-predictions 160(1), 160(2), 160(3), and so on, all arranged on a per-storage-extent basis, such that a sub-record and a sub-prediction are provided for each storage extent (Extent 1, Extent 2, Extent 3, . . . ). As previously indicated, the type of storage extent forming the basis for organizing the time-based record and predictions may be a block, slice, pool, array, or any other suitable denomination.

Each sub-record 156(1), 156(2), etc., includes data indicating IO performance for a respective storage extent versus time. In some examples, the data provides a single measure of IO activity versus time, which acts to summarize and consolidate results of individually monitored IO characteristics, such as IOPs, IO size, and so forth. In other examples, the data provides a different data set for each IO characteristic, such as one dataset providing IOPs versus time, another data set providing IO size versus time, and so on.

In an example, each of the sub-predictions 160(1), 160(2), etc., is generated from a respective sub-record of the same index, i.e., for the same storage extent. As with the sub-records, each sub-prediction may be realized as a single measure of IO activity versus time, or by separate measures of IO characteristics (IOPs, IO size, etc.) versus time.

FIG. 3 also shows the future time 164 relative to the sub-predictions. Again, the tiering manager 150 identifies the time 164 as the time by which data migration may be preformed to meet a predicted level 162 of IO activity (FIG. 1). It is assumed that the data storage system 116 includes or has access to a system clock (not shown), which forms a common time base for all sub-records and sub-predictions. In an example, the tiering manager 150 analyzes the sub-predictions to identify a window 310, which extends over a period of predicted low IO activity and is preferably long enough to allow the tiering manager 150 to achieve desired data migration prior to the time 164. Thus, when the time 164 arrives, the data storage system 116 is already configured efficiently to handle the predicted demand.

It should be noted that the tiering manager 150 may identify multiple future times, like the time 164, by which revised storage tiering may be performed. Also, the tiering manager 150 may generate multiple windows, like the window 310, for performing migration at multiple times. Further, it should be understood that there is no need for revised storage tiering to be performed for an entire data storage system all at once. Rather, revised storage tiering may be performed incrementally (e.g., one storage extent at a time), or in stages, based on priorities, available system resources, and other considerations.

Figure 4:
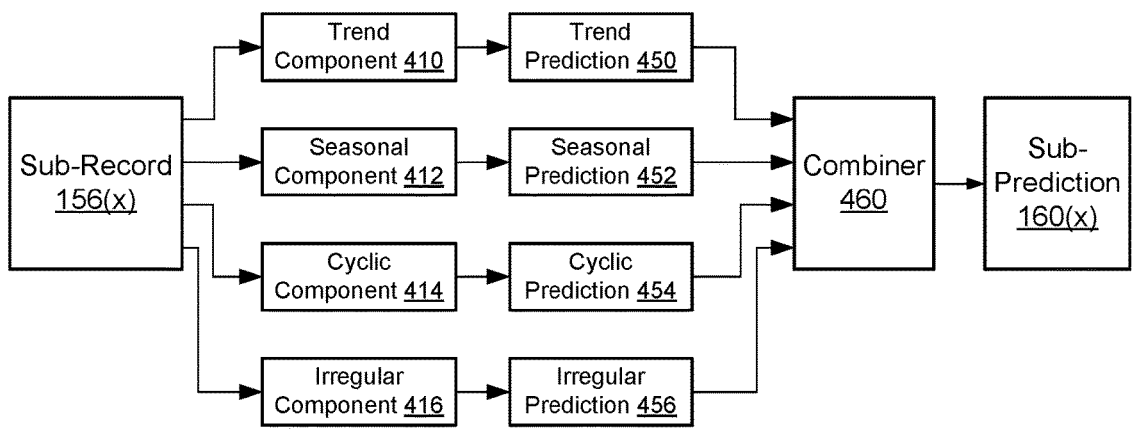
FIG. 4 is a block diagram showing an example arrangement for generating an overall prediction of IO characteristics using time-series analysis techniques.

FIG. 4 shows an example arrangement for using time-series analysis to generate predictions 160. Here, it is seen that a single sub-record 156(*x*) for a storage extent may be processed to generate a respective sub-prediction 160(*x*) for that storage extent. For simplicity or description, it is assumed that the sub-record 156(*x*) provides a single measure of IO activity versus time, rather than providing separate IO characteristics versus time, e.g., one for IOPs, one for IO size, and so forth. It is readily apparent, however, that the principles described herein may also be applied to IO characteristics individually, to generate a respective sub-prediction for each IO characteristic.

As shown, the time-series analysis proceeds by decomposing the sub-record 156(*x*) of IO activity over time into components. These components may include the following, for example:

Trend Component 410: A long-term general change in the level of data;

Seasonal Component 412: Seasonal fluctuations of known periodicity;

Cyclic Component 414: Wave-like variations of non-seasonal nature; and

Irregular Component 416: Random or chaotic variations.

Some implementations may operate with fewer components. In a particular example, only the seasonal component 412 and cyclic component 414 are employed. In some examples, the sub-record 156(*x*) may be subjected to smoothing (e.g., moving average filtering) prior to decomposition. Components may be separately smoothed following decomposition. Decomposition may proceed in known ways, which may include, for example, least-squares estimates, adaptive decomposition, and so on. Decomposition may be performed according to an additive model, for which a total prediction is assumed to be the sum of the components 410, 412, 414, and 416, or according to a multiplicative model, for which a total prediction is assumed to be the product of the components.

With the components 410, 412, 414, and 416, or some subset thereof, in place, the time-series analysis proceeds to generate component predictions 450, 452, 454, and 456, i.e., one prediction for each of the components. Component predictions 450, 452, 454, and 456 may be generated using any suitable technique, such as exponential smoothing, ARMA (autoregressive moving averages), or ARIMA (autoregressive integrated moving averages), for example.

Combiner 460 combines component predictions 450, 452, 454, and 456, or some subset thereof, to generate an overall prediction, i.e., the sub-prediction 160(x). Where the additive model is used for decomposition, the combiner 460 computes the overall prediction as the sum of component predictions. Where the multiplicative model is used for decomposition, the combiner 460 computes the overall prediction as the product of component predictions. It should be understood that if the time-series analysis operates using only the seasonal component 412 and the cyclic component 414, then only those components need be generated and only the corresponding component predictions 452 and 454 need be computed and combined.

Once the time-based analysis has been performed, the sub-prediction 160(x) provides a time-varying forecast of IO activity for a particular storage extent. The tiering manager 150 may then analyze the sub-prediction 160(x), along with other sub-predictions for other storage extents, to identify the future level 162 of IO activity at the future time 164, e.g., by identifying significant changes in predicted IO activity. The tiering manager 150 may further analyze the sub-predictions to identify the window 310 during which the placement manager 166 may perform the revised storage tiering.

Figure 5:
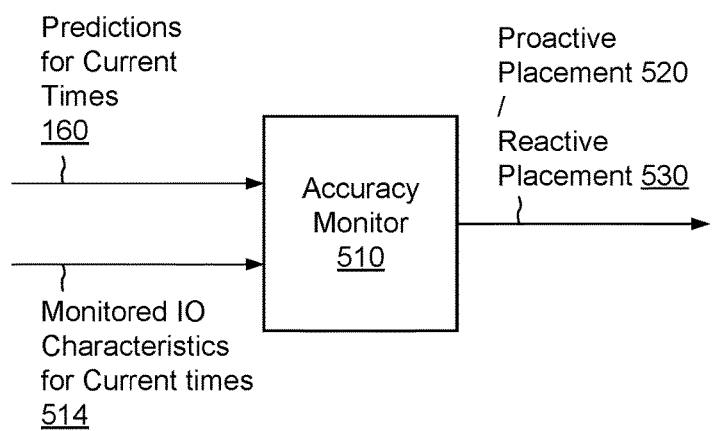
FIG. 5 is a block diagram showing an example arrangement for selecting between proactive data placement and reactive data placement.

FIG. 5 shows an example arrangement for selecting between proactive storage tiering and reactive storage tiering. Proactive storage tiering includes the above-described technique based on predictions 160 of future IO characteristics. In contrast, reactive storage tiering makes tiering decisions based on recent IO demands, without regard to predictions. The arrangement of FIG. 5 thus reflects the possibility that IO performance can sometimes be unpredictable, such that predictions 160 may become inaccurate. In such circumstances, the tiering manager 150 may temporarily fall back on the use of reactive storage tiering until accuracy improves.

As shown in FIG. 5, accuracy monitor 510 monitors proactive storage tiering and generates outputs 520 and/or 530 indicating whether or not to fall back on reactive storage tiering. For example, the accuracy monitor 510 compares predictions 160 of IO activity computed previously for times close to the current time with actual IO activity monitored at the corresponding times (e.g., by monitor 154; FIG. 1). If the IO characteristics match, e.g., if their difference falls within a predetermined limit, then accuracy monitor 510 generates output 520, which directs the placement manager 166 to perform proactive storage tiering. If the IO characteristics do not match, however, e.g., if their difference exceeds the predetermined limit, then the accuracy monitor 510 generates output 530, which directs the placement manager 166 to fall back on reactive storage tiering.

In an example, the tiering manager 150 continues to build the record 156 of IO characteristics (FIG. 1) and to generate the predictions 160 even when the placement manager 166 is performing reactive storage tiering. In this manner, the accuracy monitor 510 may continue to compare predictions 160 with actual IO activity 514 and may restore proactive storage tiering at a later time, e.g., after the difference between predictions 160 and actual IO activity 514 falls below the threshold.

Figure 6:
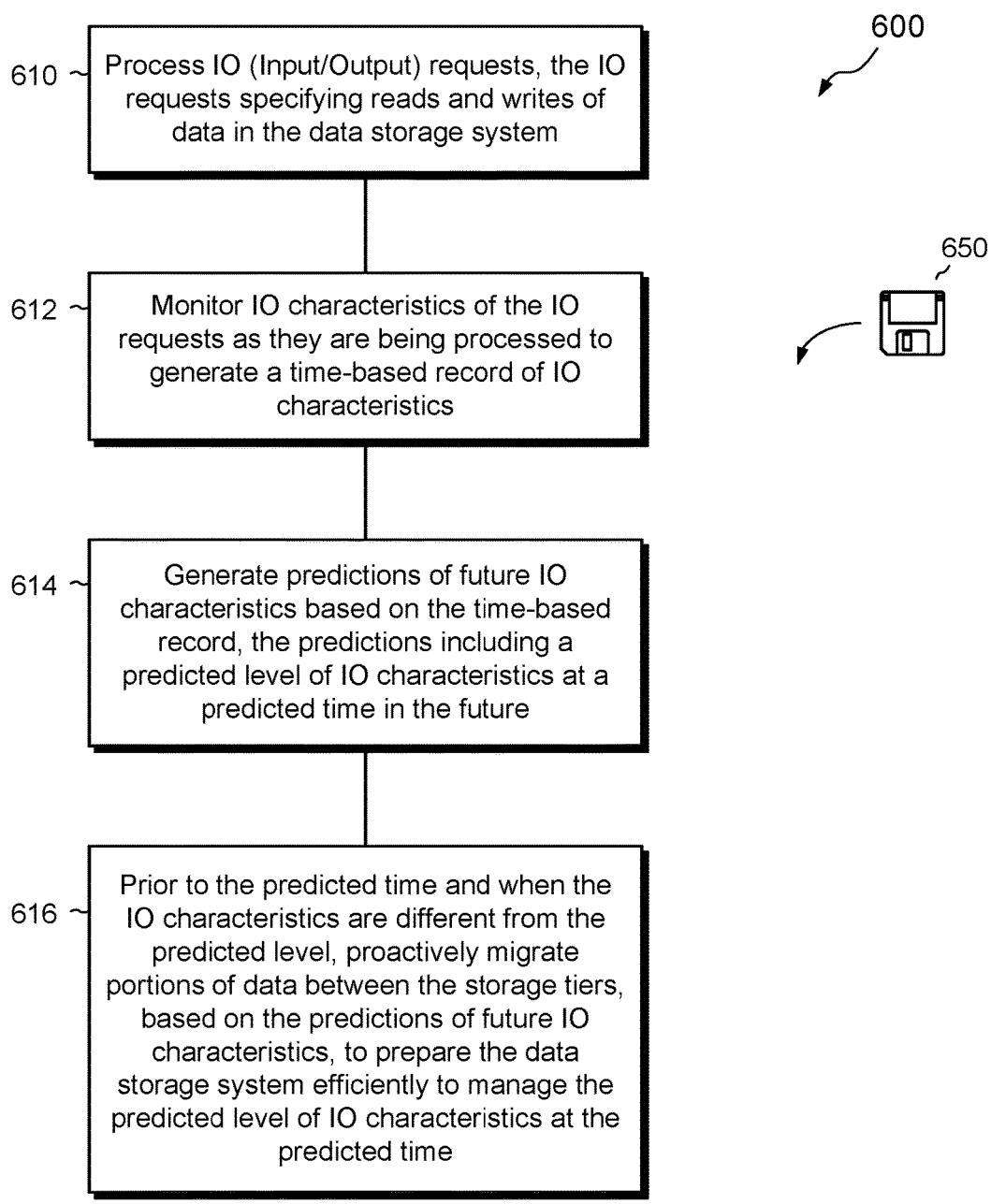
FIG. 6 is a flow chart showing an example process for performing proactive storage tiering in a data storage system, such as the data storage system shown in FIG. 1.

FIG. 6 shows an example process 600 for performing storage tiering in a data storage system having multiple storage tiers, each storage tier providing a respective quality of service. The process 600 may be performed by the software constructs, described in connection with the data storage system 116 of FIG. 1, which reside in the memory 130 of the storage processor 120 and are run by the set of processing units 124. The various acts of the process 600 may be ordered in any suitable way. Accordingly, embodiments may be constructed in which acts are performed in orders different from that illustrated, which may include performing some acts simultaneously, even though the acts are shown as sequential in the illustrated embodiments.

At 610, IO (Input/Output) requests are processed. The IO requests specify reads and writes of data in the data storage system. For example, as shown in FIG. 1, the data storage system 116 receives IO requests 112 from hosts 110(1)-110(N). The IO requests 112 specify reads and writes of data objects, such as LUNs, file systems, VVols, and so forth, in the data storage system 116.

At 612, IO characteristics of the IO requests are monitored as they are being processed to generate a time-based record of IO characteristics. For example, monitor 154 disposed in the IO stack 140 checks IO requests 112 as they are processed and obtains therefrom IO characteristics, such as IOPs, IO size, read/write distribution, random/sequential distribution, and so forth. Monitor 154 applies timestamps to obtained characteristics and stores the characteristics and associated timestamps in the record 156. In an example, IO characteristics are stored in the record 156 on a per-storage-extent basis.

At 614, predictions are generated of future IO characteristics based on the time-based record. The predictions include a predicted level of IO characteristics at a predicted time in the future. For example, prediction manager 152 analyzes the record 156 and generates predictions 160, e.g., using time series analysis. Predictions 160 may include a particular level 162 of IO characteristics at a particular time 164 in the future.

At 616, prior to the predicted time and when the IO characteristics are different from the predicted level, portions of data are proactively migrated between the storage tiers, based on the predictions of future IO characteristics, to prepare the data storage system efficiently to manage the predicted level of IO characteristics at the predicted time. For example, during an identified window 310 of time prior to the time 164, and when the IO characteristics are different from the predicted level 162, e.g., before they have reached the predicted level 162, the placement manager 166 proactively migrates portions of data 170 between storage tiers. For example, some portions 170 may be migrated from a lower tier to a higher tier, whereas other portions may be migrated from a higher tier to a lower tier. Such migration of portions of data 170 better prepares the data storage system 116 to meet the predicted storage demands when the time 164 arrives.

An improved technique has been described for performing storage tiering in a data storage system 116. The technique includes monitoring storage demands over time to generate a time-based record 156 of storage demands. Based on the time-based record 156, the technique makes predictions 160 of future demands and proactively performs storage tiering based on the predictions 160. The improved technique therefore readies the data storage system 116 for predictable changes in demand, such that, should those changes occur, the data storage system is already configured to manage them efficiently. Delays in responding to changes in demand and consequent reductions in quality of service are therefore reduced or eliminated.

Having described certain embodiments, numerous alternative embodiments or variations can be made. For example, although the description of proactive storage tiering above has focused on slice-level granularity, storage tiering may alternatively be performed at the granularity of other types of storage extents, such as blocks, pools, and even entire arrays, for example. For performing proactive storage tiering at the pool level, for example, a source storage pool may be configured entirely from a first storage tier, and a destination storage pool may be configured entirely from a second storage tier. Migration may then take place by copying data from the source storage pool to the destination storage pool. Such migration may be conducted within the data storage system 116 or even between data storage systems. When migrating between pools in the data storage system 116, copying data may include operating a fast-copy driver in the IO stack 140. The fast-copy driver copies data from a source pool into a cache and then writes the data to a destination pool from the cache. When migrating between pools on different data storage systems, copying data may be accomplished over a network. In some examples, data copying may be performed by a replication transport, such as one supporting snapshot shipping, which takes one or more snaps of the source pool on one data storage system and ships them to the destination pool on another data storage system. Migration of entire data storage systems may be performed in a similar fashion, e.g., over a network and, in some examples, with the aid of existing replication technology.

Also, although embodiments have been shown and described in connection with systems specifically designed for data storage, in both their hardware and software, embodiments of the invention hereof may also be practiced with software-defined storage (SDS) systems. SDS systems may include general-purpose hardware on which specialized software is run to realize the functionality of data storage systems. As used herein, the term "data storage system" is intended to include systems specifically designed for data storage as well as SDS systems. Further, it is understood that running SDS software on general-purpose hardware has the effect of realizing a data storage system.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of performing storage tiering in a data storage system having multiple storage tiers, each storage tier providing a respective quality of service, the method comprising:
   processing IO (Input/Output) requests, the IO requests specifying reads and writes of data in the data storage system;
   monitoring IO characteristics of the IO requests as they are being processed to generate a time-based record of IO characteristics;
   generating predictions of future IO characteristics based on the time-based record, the predictions including a predicted level of IO characteristics at a predicted time in the future; and
   prior to the predicted time and when the IO characteristics are different from the predicted level, proactively migrating portions of data between the storage tiers, based on the predictions of future IO characteristics, to prepare the data storage system efficiently to manage the predicted level of IO characteristics at the predicted time,
   wherein the method further comprises (i) monitoring accuracy of the predictions of future IO characteristics and (ii) in response to accuracy of the predictions being low, falling back to a reactive data migration scheme in which the portions of data on the storage extents are moved only after average IO traffic to those storage extents changes.

2. The method of claim 1, further comprising:
   receiving an IO request specifying new data to be written to the data storage system; and
   performing a data placement operation on the new data to identify a storage tier on which to place the new data in the data storage system based on the generated predictions of future IO characteristics.

3. The method of claim 1, wherein proactively migrating the portions of data includes, for each portion of data, performing a data placement operation to identify a target storage tier on which to place that portion of data based on the predictions of future IO characteristics.

4. The method of claim 3, further comprising:
   identifying, based on the predictions of future IO characteristics, a window of time during which the predictions indicate that the data storage system will be relatively inactive compared with other times, wherein proactively migrating the portions of data is performed during the identified window of time.

5. The method of claim 3,
wherein the data storage system includes a set of storage extents, each storage extent in the set of storage extents backed by a respective single storage tier, and wherein monitoring the IO characteristics of the IO requests is performed on a per-storage-extent basis, such that IO characteristics are monitored for each of the set of storage extents to generate a respective time-based sub-record for each of the set of storage extents, and
wherein generating the predictions of future IO characteristics includes generating a respective predicted level of IO characteristics at the predicted time for each of the set of storage extents based on the respective time-based sub-record for that storage extent.

6. The method of claim 5,
wherein proactively migrating the portions of data is performed on a per-storage-extent basis,
wherein, prior to proactively migrating the portions of data, each of the portions of data is stored in a respective one of the set of storage extents on a respective one of the storage tiers, and
wherein proactively migrating the portions of data includes copying each of the portions of data to a different storage tier.

7. The method of claim 6, wherein the monitored IO characteristics include, on the per-storage-extent basis, a measure of IO requests received per second (IOPs), an indication of whether each IO request is a read or a write, and an IO size identifying an amount of data specified in each IO request.

8. The method of claim 7, wherein the monitored IO characteristics further include, on the per-storage-extent basis, an indication of whether each IO request specifies a random read or write of data or a sequential read or write of data.

9. The method of claim 1, wherein generating the predictions of future IO characteristics includes performing a time-series analysis on the time-based record of IO characteristics, the time-series analysis including:
a seasonal component indicating seasonal variations; and
a cyclic component indicating cyclic variations of a non-seasonal nature,
wherein generating the predictions of future IO characteristics includes separately generating a seasonal prediction based on the seasonal component and a cyclic prediction based on the cyclic component, and combining the seasonal and cyclic predictions to produce an overall prediction.

10. A data storage system, comprising control circuitry that includes a set of processing units coupled to memory, the control circuitry constructed and arranged to perform a method of storage tiering among multiple storage tiers, each storage tier providing a respective quality of service, the method comprising:
processing IO (Input/Output) requests, the IO requests specifying reads and writes of data in the data storage system;
monitoring IO characteristics of the IO requests as they are being processed to generate a time-based record of IO characteristics;
generating predictions of future IO characteristics based on the time-based record, the predictions including a predicted level of IO characteristics at a predicted time in the future; and
prior to the predicted time and when the IO characteristics are different from the predicted level, proactively migrating portions of data between the storage tiers, based on the predictions of future IO characteristics, to prepare the data storage system efficiently to manage the predicted level of IO characteristics at the predicted time,
wherein generating the predictions of future IO characteristics includes—
performing a time-series analysis on the time-based record of IO characteristics, the time-series analysis including (i) a seasonal component indicating seasonal variations and (ii) a cyclic component indicating cyclic variations of a non-seasonal nature; and
separately generating a seasonal prediction based on the seasonal component and a cyclic prediction based on the cyclic component, and combining the seasonal and cyclic predictions to produce an overall prediction.

11. The data storage system of claim 10, wherein the method further comprises:
receiving an IO request specifying new data to be written to the data storage system; and
performing a data placement operation on the new data to identify a storage tier on which to place the new data in the data storage system based on the generated predictions of future IO characteristics.

12. The data storage system of claim 10, wherein proactively migrating the portions of data includes, for each portion of data, performing a data placement operation to identify a target storage tier on which to place that portion of data based on the predictions of future IO characteristics.

13. A computer program product including a set of non-transitory, computer-readable media having instructions which, when executed by control circuitry of a data storage system, cause the control circuitry to perform a method for performing storage tiering in a data storage system having multiple storage tiers, each storage tier providing a respective quality of service, the method comprising:
processing IO (Input/Output) requests, the IO requests specifying reads and writes of data in the data storage system;
monitoring IO characteristics of the IO requests as they are being processed to generate a time-based record of IO characteristics;
generating predictions of future IO characteristics based on the time-based record, the predictions including a predicted level of IO characteristics at a predicted time in the future; and
prior to the predicted time and when the IO characteristics are different from the predicted level, proactively migrating portions of data between the storage tiers, based on the predictions of future IO characteristics, to prepare the data storage system efficiently to manage the predicted level of IO characteristics at the predicted time,
wherein generating the predictions of future IO characteristics includes performing a time-series analysis on the time-based record of IO characteristics, the time-series analysis including a seasonal component indicating seasonal variations and a cyclic component indicating cyclic variations of a non-seasonal nature, and
wherein generating the predictions of future IO characteristics includes separately generating a seasonal prediction based on the seasonal component and a cyclic prediction based on the cyclic component, and combining the seasonal and cyclic predictions to produce an overall prediction.

14. The computer program product of claim 13, wherein the method further comprises:
   receiving an IO request specifying new data to be written to the data storage system; and
   performing a data placement operation on the new data to identify a storage tier on which to place the new data in the data storage system based on the generated predictions of future IO characteristics.

15. The computer program product of claim 13, wherein proactively migrating the portions of data includes, for each portion of data, performing a data placement operation to identify a target storage tier on which to place that portion of data based on the predictions of future IO characteristics.

16. The computer program product of claim 15, wherein the method further comprises:
   identifying, based on the predictions of future IO characteristics, a window of time during which the predictions indicate that the data storage system will be relatively inactive compared with other times,
   wherein proactively migrating the portions of data is performed during the identified window of time.

17. The computer program product of claim 15,
   wherein the data storage system includes a set of storage extents, each storage extent in the set of storage extents backed by a respective single storage tier, and wherein monitoring the IO characteristics of the IO requests is performed on a per-storage-extent basis, such that IO characteristics are monitored for each of the set of storage extents to generate a respective time-based sub-record for each of the set of storage extents, and
   wherein generating the predictions of future IO characteristics includes generating a respective predicted level of IO characteristics at the predicted time for each of the set of storage extents based on the respective time-based sub-record for that storage extent.

18. The computer program product of claim 17,
   wherein proactively migrating the portions of data is performed on a per-storage-extent basis,
   wherein, prior to proactively migrating the portions of data, each of the portions of data is stored in a respective one of the set of storage extents on a respective one of the storage tiers, and
   wherein proactively migrating the portions of data includes copying each of the portions of data to a different storage tier.

19. The computer program product of claim 18, wherein the monitored IO characteristics include, on the per-storage-extent basis, a measure of IO requests received per second (IOPs), an indication of whether each IO request is a read or a write, and an IO size identifying an amount of data specified in each IO request.

20. The computer program product of claim 19, wherein the monitored IO characteristics further include, on the per-storage-extent basis, an indication of whether each IO request specifies a random read or write of data or a sequential read or write of data.

* * * * *